United States Patent
Rubinstein et al.

(10) Patent No.: US 11,615,443 B2
(45) Date of Patent: Mar. 28, 2023

(54) SYSTEM AND METHOD TO SELECTIVELY UPDATE SUPPLEMENTAL CONTENT RENDERED IN PLACEMENT REGIONS OF A RENDERED PAGE

(71) Applicant: Topix LLC, Palo Alto, CA (US)

(72) Inventors: Steven Rubinstein, Palo Alto, CA (US); Gary Michael Sawka, Jr., Palo Alto, CA (US)

(73) Assignee: Topix LLC, Palo Alto, CA (US)

( * ) Notice: Subject to any disclaimer, the term of this patent is extended or adjusted under 35 U.S.C. 154(b) by 0 days.

(21) Appl. No.: 17/150,930

(22) Filed: Jan. 15, 2021

(65) Prior Publication Data

US 2022/0058696 A1  Feb. 24, 2022

Related U.S. Application Data

(63) Continuation of application No. 15/688,839, filed on Aug. 28, 2017, now Pat. No. 10,896,445.

(51) Int. Cl.
*G06Q 30/02* (2012.01)
*G06Q 30/0273* (2023.01)
*G06Q 30/0241* (2023.01)
*G06F 16/958* (2019.01)
*G06F 16/23* (2019.01)
*H04L 67/53* (2022.01)

(52) U.S. Cl.
CPC ..... *G06Q 30/0275* (2013.01); *G06F 16/2379* (2019.01); *G06F 16/986* (2019.01); *G06Q 30/0277* (2013.01); *H04L 67/53* (2022.05)

(58) Field of Classification Search
USPC .................................................. 705/319, 14
See application file for complete search history.

(56) References Cited

U.S. PATENT DOCUMENTS

| | | | | |
|---|---|---|---|---|
| 7,814,089 B1 * | 10/2010 | Skrenta | ................. | G06F 16/951 |
| | | | | 715/229 |
| 8,185,514 B1 * | 5/2012 | Skrenta | .............. | G06Q 30/0255 |
| | | | | 707/738 |
| 8,473,347 B1 * | 6/2013 | Koningstein | .......... | G06Q 30/02 |
| | | | | 705/14.43 |
| 9,772,979 B1 * | 9/2017 | Young | ................. | G06F 16/9574 |
| 2007/0203824 A1 * | 8/2007 | Whelchel | ........... | G06Q 30/0601 |
| | | | | 705/37 |
| 2008/0080552 A1 * | 4/2008 | Gates | ...................... | H04L 12/66 |
| | | | | 370/468 |
| 2009/0192984 A1 * | 7/2009 | Abrams | ................. | G06Q 30/02 |

(Continued)

OTHER PUBLICATIONS

Charging for Residual Views of Paid Advertisement Impressions (Year: 2014).*

(Continued)

*Primary Examiner* — Gautam Ubale
(74) *Attorney, Agent, or Firm* — Mahamedi IP Law LLP

(57) ABSTRACT

A computer system or computer-implemented process monitors a page rendering, including supplemental content rendered in one or more placement regions, for one or more viewability parameters. In response to a page event, the computer system or process selectively updates the one or more placement regions on the rendered page, based on a determination of whether the supplemental content of each placement region satisfied the one or more viewability criteria.

11 Claims, 4 Drawing Sheets

(56) References Cited

U.S. PATENT DOCUMENTS

| | | | |
|---|---|---|---|
| 2009/0199107 A1* | 8/2009 | Lewis | G06Q 30/0271 715/745 |
| 2010/0063881 A1* | 3/2010 | Ghosh | G06Q 30/0256 705/14.54 |
| 2010/0205036 A1* | 8/2010 | Van Der Haar | G06Q 30/0267 715/863 |
| 2010/0228634 A1* | 9/2010 | Ghosh | G06Q 30/0275 705/26.1 |
| 2011/0035274 A1* | 2/2011 | Goel | G06Q 30/0273 705/14.69 |
| 2011/0321003 A1* | 12/2011 | Doig | G06Q 30/0276 717/107 |
| 2013/0031470 A1* | 1/2013 | Daly, Jr. | G06F 40/103 715/243 |
| 2013/0066705 A1* | 3/2013 | Umeda | G06Q 30/0241 705/14.41 |
| 2013/0091019 A1* | 4/2013 | Mallon | G06Q 30/0251 705/14.69 |
| 2013/0185164 A1* | 7/2013 | Pottjegort | G06Q 30/02 705/14.73 |
| 2013/0325633 A1* | 12/2013 | McAfee | G06Q 30/02 705/14.68 |
| 2014/0019441 A1* | 1/2014 | Shieh | G06F 16/9535 707/722 |
| 2014/0129352 A1* | 5/2014 | Ringdahl | G06Q 30/0275 705/14.71 |
| 2014/0136313 A1* | 5/2014 | Shaw | G06Q 30/0246 705/14.41 |
| 2014/0180829 A1* | 6/2014 | Umeda | G06Q 30/0273 705/14.69 |
| 2014/0258870 A1* | 9/2014 | Gordon | G06F 1/1694 715/733 |
| 2014/0279056 A1* | 9/2014 | Sullivan | G06Q 30/0275 705/14.71 |
| 2014/0281858 A1* | 9/2014 | Yi | G06F 40/134 715/205 |
| 2015/0154650 A1* | 6/2015 | Umeda | G06Q 30/08 705/14.68 |
| 2015/0193817 A1* | 7/2015 | Dharmaji | G06Q 30/0246 705/14.45 |
| 2015/0294371 A1* | 10/2015 | Agrawal | G06Q 30/0275 705/14.71 |
| 2017/0116645 A1* | 4/2017 | Bishop | G06Q 30/0275 |
| 2017/0140437 A1* | 5/2017 | Bhat | H04L 67/53 |
| 2017/0161774 A1* | 6/2017 | Gorsline | G06Q 30/0269 |
| 2017/0161782 A1* | 6/2017 | Wigder | G06Q 30/0272 |
| 2017/0277415 A1* | 9/2017 | Kim | G06F 3/0482 |
| 2018/0060294 A1* | 3/2018 | Fauchére | G06F 40/186 |
| 2018/0144059 A1* | 5/2018 | Saikia | G06F 16/9577 |
| 2019/0043092 A1* | 2/2019 | Zacharski | G06Q 30/0277 |
| 2022/0365872 A1* | 11/2022 | Finkelstein | G06F 11/3688 |

OTHER PUBLICATIONS

Collaborative_Caching_in_Wireless_Video_Streaming_Through_Resource_Auctions (Year: 2012).*

Automated Bidding in Computing Service Markets Strategies, Architectures, Protocols (Year: 2011).*

* cited by examiner

SYSTEM AND METHOD TO SELECTIVELY UPDATE SUPPLEMENTAL CONTENT RENDERED IN PLACEMENT REGIONS OF A RENDERED PAGE

RELATED APPLICATIONS

This application is a continuation of U.S. patent application Ser. No. 15/688,839, filed Aug. 28, 2017, the aforementioned priority application being hereby incorporated by reference in its entirety for all purposes.

TECHNICAL FIELD

Examples provide for a system and method to selectively update supplemental content rendered in placement regions of a rendered page.

DETAILED DESCRIPTION

Figure 1:
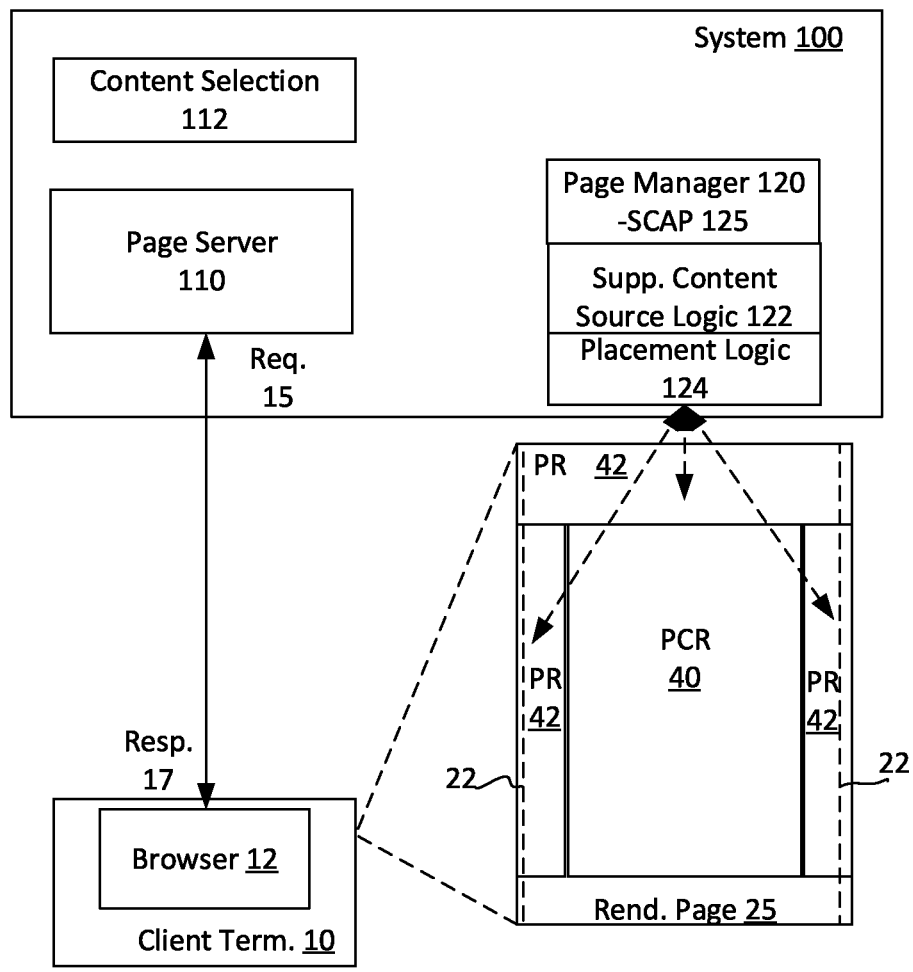
FIG. 1 illustrates an example page rendering system that selectively updates supplemental content in response to page events.

According to examples, a computer system or computer-implemented process monitors a page rendering, including supplemental content rendered in one or more placement regions, for one or more viewability parameters. In response to a page event, the computer system or process selectively updates the one or more placement regions on the rendered page, based on a determination of whether the supplemental content of each placement region satisfied the one or more predetermined criteria. In some examples, the criteria may be based on conditions by which a publisher may receive credit or value for the rendering of supplemental content from a third-party (e.g., content source partner). For example, the computer system or process may select to update a placement region with a new supplemental content item, based on a duration in which the existing supplemental content is rendered, and/or a portion of the existing supplemental content that is rendered within, for example, a window of a browser. In variations, the criteria may be determined from a content source partner, or by predetermined rules of the publisher and/or system 100.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates an example page rendering system to selectively update supplemental content in response to page events (e.g., user clicking to see additional content). An example page rendering system 100 may be implemented in a variety of computing environments, such as with use of a server (or combination of servers) and client computer. In some examples, system 100 may be implemented in a distributed computing environment, where a server (e.g., physical server, combination of servers, virtual server, etc.) distributes scripts or other logic that triggers a corresponding browser 12 of a client terminal 10 in retrieving content and other data, as well as scripts and other logic from a server system.

In more detail, system 100 includes a page server 110, a content selection 112, and a page manager 120. The page server 110 may respond to a content request 15 from browser 12 of client terminal 10 by retrieving content from the content selection 112. In an example, the page server 110 responds to a content request 15 by providing a page response 17 to the browser 12. The browser 12 may render the page 25 using the data set of the page response 17. In turn, the browser 12 displays the rendered page 25 to include content, structure and logic, as provided by the page server 110.

The client terminal 10 and browser 12 may be representative of multiple client terminals and browsers which make content requests by accessing a network site 101 hosted by a page server 110. The network site 101 may host content of a publisher, which can be viewed as the rendered page 25 by the user's browser. The client terminal 10 may correspond to, for example, a personal computing device (e.g., desktop computer, laptop computer), mobile device (e.g., multifunction cellular device, tablet device (including "phablets")) or wearable device. The browser 12 may correspond to any program or application that can request content from a server or server process, using a link (e.g., uniform resource locator ("URL")) or network address. By way of example, the browser 12 may correspond to a commercially available web browser (e.g., GOOGLE CHROME, MOZILLA FIREFOX, INTERNET EXPLORER), a specialized application (or "app") used by some mobile computing platforms (e.g., APPLE IOS and GOOGLE ANDROID) and web-based operating systems (e.g., GOOGLE CHROMEBOOK). Thus, the client terminal 10 and browser 12 may be implemented on any one of multiple different computing environments and platforms.

In an example, the rendered page 25 includes a primary content region 40, one or more placement regions 42, and functional elements (e.g., scripts) for retrieving supplemental content from supplemental content sources (e.g., advertiser network). In some examples, the rendered page 25 may be provided with scripts or other functional components that can trigger the browser 12 to perform operations such as implement triggers and make calls for content (e.g., for supplemental content) or other scripts or functional components. In some variations, the page manager 120 includes components and functionality that are implemented in whole or in part by scripts or code implemented through the browser 12 of the client terminal 10.

According to some examples, the page manager 120 includes supplemental content source logic 122 and placement logic 124. When the browser 12 initially accesses the network location of page server 110, the browser 12 renders the rendered page 25 to display primary content, as provided by the page server 110 via the content selection 112, in the primary content region 40. As described in greater detail, the page manager 120 may also implement processes to select and render supplemental content in the one or more placement regions placement region 42, so that the supplemental content and primary content are rendered at the same time by the browser 12.

According to some examples, the page manager 120 implements a supplemental acquisition process 125 to acquire supplemental content for individual placement regions 42 of the rendered page 25. The acquisition process 125 can be triggered to select supplemental content for individual regions 42 of the rendered page 25. In particular, the page manager 120 may trigger a separate acquisition process 125 for each placement region 42. Additionally, the page manager 120 may trigger the acquisition process(es) 125 in response to predetermined events, such a page event, where a user elects to view a next article or slide on a web page. Once triggered, the supplemental content acquisition process 125 results in the selection of a supplemental content item (e.g., advertisement) that is associated with a value. The value may be credited to an account of the publisher, provided the rendering of the selected content item satisfies one or more criteria that are specified by rules. The criteria may include a viewability criteria, which may be defined by a duration. The viewability criteria may also be defined by a duration in which the rendering of the supplemental content item is of a particular state, such as a state in which a designated portion of the supplemental content item is viewable to the browser 12. With reference to an example of FIG. 1, the viewable state may be identified by a portion of the supplemental content item that is rendered within a browser window 22 (e.g., "positioning criteria"). Different viewability criteria may be used for different types of supplemental content items. For example, the viewability criteria for video type content may specify longer durations, as well as triggering conditions from when observations on viewability can be made. For example, the viewability criteria may specify a threshold duration measured from the time when playback is initiated, or a threshold duration starting from the time when the video content is loaded.

Still further, in other variations, the viewability criteria may be specific to other factors, such as criteria specified by the content source (e.g., specific ad network). As an addition or variation, the viewability criteria may be specific to individual supplemental content items (e.g., provided by bids 123). Still further, the viewability criteria can be based on other conditions, such as value associated with specific supplemental content items, such as those which reward publishers for relatively larger amounts based on the supplemental content item being rendered an extended period of time.

According to examples, the page manager 120 selectively performs the supplemental content acquisition process 125 for individual content regions 42. In particular, the supplemental content acquisition process 125 may be implemented by (i) detecting a page event where at least some content on the rendered page 25 (e.g., primary content) is to be refreshed; and (ii) after detecting the page event, the page manager 120 making a determination as to whether an existing supplemental content item (e.g., a rendered advertisement) meets one or more criteria, such as viewability criteria by which the publisher may be credited for rendering the supplemental content. In some examples, the page manager 120 implements the supplemental content acquisition process 125 upon making the determination that the existing supplemental content item satisfies the viewability criteria. Else, if the existing supplemental content item does not satisfy the criteria, the page manager 120 does not trigger the supplemental acquisition process 125.

In variations, the page manager 120 may make additional determinations in electing one of (i) initiating the content acquisition process 125, or (ii) maintaining the existing supplemental content item at a given content region 42. For example, the page manager 120 may make a determination as to a likelihood that the new supplemental content item (if retrieved) will satisfy the viewability criteria. The determination of the likelihood may be based on predefined indicators of the likelihood. For example, the determination of whether a new supplemental content item would satisfy the viewability criteria may correspond to the page manager 120 detecting a frequency of page events over a preceding interval. By way of example, the preceding interval may correspond to a time between a last page event and a current page event, a number of page events in a predefined duration of time preceding the current page view, a duration of time for a given number of preceding page events, and/or an average time between one or more preceding page events. If the page events are relatively rapid (e.g., user clicks through a slide presentation of a web page in rapid succession), the determination may be that a refresh of the supplemental content item would likely not meet the desired viewability criteria, and maintaining the existing supplemental content item in the corresponding placement region 42 will likely result in the existing supplemental content item meeting the viewability criteria. For such determinations, the page manager 120 may elect to maintain the existing supplemental content item at the corresponding placement region 42.

According to examples, the determination made by the page manager 120 with respect to initiating the supplemental content acquisition process may be performed separately for each placement region. Thus, after a given page event, the page manager 120 may determine to initiate the supplemental content acquisition process for a first placement region, while maintaining the existing supplemental content of a second placement region.

As an addition or variation, the page manager 120 can make a determination to refresh a placement region based on a predicted or known value of new supplemental content item that will be used to refresh a given placement region 42. In particular, the page manager 120 may select to queue a result of a prior supplemental acquisition process 125, for use in a next refresh opportunity. For example, as described below, the supplemental content acquisition process 125 may include a request (e.g., requests 121) and reply (e.g., bids 123) exchange with multiple possible content sources (e.g., advertisement partners or networks). For a given rendered page 25, the page manager may initiate the supplemental acquisition process 125 to receive bids 123 from each content source, where each bid specifies an alternative content item along with a corresponding value. In some examples, the page manager 120 implements a cut-off time for receipt of bids 123 (e.g., 1 second, 100 ms, etc.) in order to ensure timely rendering of the supplemental content in conjunction with the page event. If a bid with a high associated value is received after the cut-off time, the page manager 120 may queue the bid for the next page event.

In some variations, the page manager 120 holds-over unused bids 123 for subsequent use in later instances. For example, the page manager 120 may cache unused bids 123 for a given duration of time. In variations, the page manager 120 may cache only those bids that satisfy a criteria (e.g., value criteria). If a particular bid is unused after an initial page event, the page manager 120 may consider the bid at the next page event. The cached bids 123 may be associated with a timespan that designates the duration in which the respective bid will be considered. Alternatively, the page manager 120 may utilize rules, such as default rules, or source-specific rules, to determine the timespan by which a cached bid can be maintained and used. Once a given bid 123 is used or expired, it may be removed from the cache.

The page event can be predefined to correspond to, for example, the browser 12 (e.g., via user interaction) requesting a new page or primary content. Thus, the page event can correspond to manual input, the passage of time (e.g., automated refresh) and/or occurrences of other events. Once initiated, the supplemental acquisition process 125 generates one or more supplemental content requests 121 for each placement region 42 of the rendered page 25. The supplemental content requests 121 may include profile information, such as obtained through use of cookies, identifying information about the browser 12, the browser session or the client terminal 10.

In some variations, the page manager 120 generates multiple supplemental content requests 121 for each placement region 42, as part of a process to acquire a single supplemental content item for that placement region. Each supplemental content request 121 may be sent to a corresponding content source, such as an advertisement network or provider. In some examples, multiple content sources are utilized for each placement region 42, at each instance when the placement region 42 is updated. As multiple placement regions 42 are provided with the rendered page 25, the page manager 120 may send multiple content requests 121 to each content source. Each content request 121 may include profile information, such as cookie data which identifies select characteristics of the browser session. The characteristics may determine, for example, the value associated with the individual bids 123.

In some variations, the page manager 120 submits the selected bid for each sub-region 42 to an additional rendering service, which renders the supplemental content identified by the selected bid 123. The rendering service may also replace the supplemental content item of the selected bid 123 with a service-selected content item under applicable rules (e.g., for the same or greater value as the selected bid 123).

By selectively implementing the content acquisition process 125, the page manager 120 can also significantly reduce the number of content requests 121 which are generated and issued for a given network page 25. For example, the page manager 120 may submit requests 121 to 10 content sources for a rendered page that includes 5 placement regions 42. Thus, the page manager 120 may submit 50 content requests for each page event. However, by selectively implementing the content acquisition process 125, the page manager 120 can significantly reduce a number of content requests 121, and thus reduce the number of bids 123 which are returned. As a result, the number of activities (e.g., remote calls) associated with the browser 12 rendering the page is reduced, consuming less bandwidth and processing resources of the client terminal 10, and improving the browser's performance (and user experience) with respect to rendering the page 25.

With further reference to an example of FIG. 1, the page manager 120 utilizes placement logic 124 to monitor the rendering of supplemental content items at individual content regions 42 of the rendered page 25. The placement logic 124 may determine parametric values, such as (i) the amount of time which a supplemental content item is rendered in a given content region 42; and/or (ii) a proportion of the supplemental content item which is within the window 22 of the browser 12. The page manager 120 may utilize the parametric values as determined by the placement logic 124 in order to determine whether the supplemental content acquisition process 125 is to be initiated.

In some examples, the page manager 120 also utilizes source logic 122 to manage determinations relating to exchanges with content sources. For example, the page manager 120 may employ specific rules in selecting content sources to send requests 121 to, as well as rules that designate when bids 123 from specific sources are to be prioritized. In some examples, the source logic 122 may also be used to monitor activity with specific content sources. The monitored activity can be analyzed for specific characteristics. In one example, source logic 122 may monitor to detect the number of requests 121 made to a particular content source over a given duration of time. The page manager 120 may also separately retrieve the number of requests 121 which the content source records as being received from the system 100 (or the publisher) over the same duration of time. In this way, the page manager 120 can compare the number of requests 121 which are sent to each content provider using the content source logic 122. The page manager 120 may utilize logic to identify criteria for detecting and measuring discrepancies between the number of requests 121 which are sent to each content source, and the number of requests each content source records as receiving. Based on the discrepancy, the page manager 120 may elect to implement remedial measures. For example, the page manager 120 may implement weights in selecting bids 123, resulting in content sources with relatively high discrepancy measurements being de-prioritized when respective bids 123 are selected.

While examples of FIG. 1 provide that the system 100 includes page server 110 and content selection 112, in variations, the system 100 may be implemented separately from the page server 110. Rather, in variations, the system 100 may be implemented as a separate service that monitors and enhances the rendering of supplemental content on rendered pages. For example, the system 100 may be implemented as part of an advertisement network that submits supplemental content bids and/or selects supplemental content for rendered pages based on submitted bids.

Figure 2A:
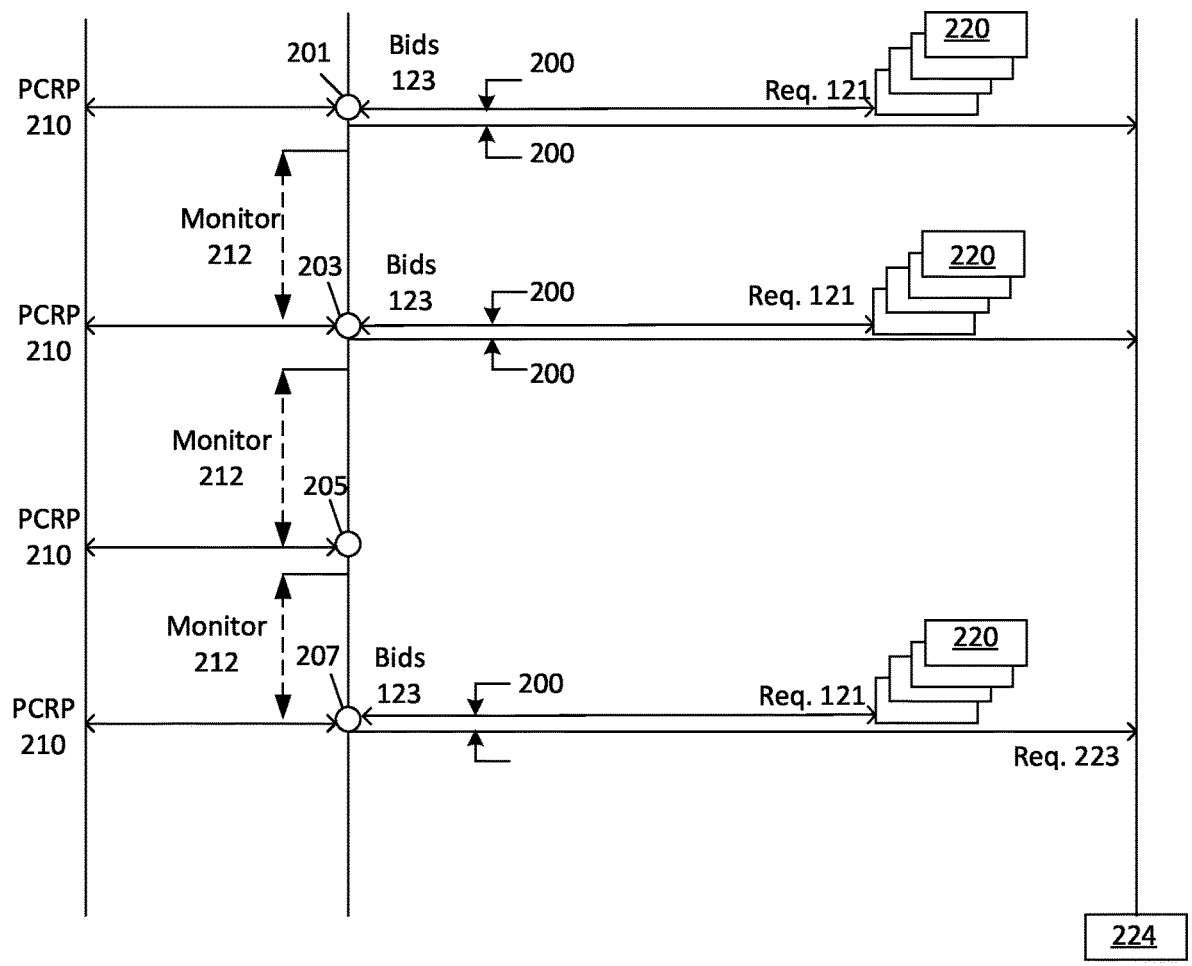
FIG. 2A illustrates a timing diagram for a supplemental content acquisition process that can be implemented with page rendering system 100, in connection with the rendering of primary content.

FIG. 2A illustrates a timing diagram for a supplemental content acquisition process that can be implemented with page rendering system 100. With reference to an example of FIG. 2A, the supplemental acquisition process 200 may be implemented at multiple instances, in connection with the system 100 updating the primary content of the rendered page 25. In some examples, the supplemental acquisition process 200 may be implemented in part by functionality distributed with the rendered page 25. In an example of FIG. 2A, the browser 12 may initiate a primary content retrieval process 210, in connection with page events (e.g., user input). With performance of the primary content retrieval process 210, the page manager 120 may initiate the supplemental content acquisition process 200. In some examples, the supplemental content acquisition process 200 may be implemented in part by scripts or other functionality that run through the browser 12 of the user terminal 10. In a given page, multiple instances of the supplemental content acquisition process 200 may be implemented concurrently with a single instance of the primary content retrieval process 210. For example, multiple individual instances of the supplemental content acquisition process 200 may be used to obtain supplemental content for a specific placement region 42, on a rendered page 25 where multiple placement regions 42 are provided.

At an initial time (page generation event 201), the page manager 120 may start when the page server 110 generates the rendered page for the browser 12. When started, the page server 110 provides primary content for the rendered page 25, and the page manager 120 implements the supplemental content acquisition process by sending requests 121 to content sources 220, and receiving bids 123 from at least some of the content sources. The requests 121 may specify bid selection criteria, such as profile information, corresponding to information determined from the browser 12, browser session or the user's terminal 10. In some variations, some or all of the returned bids 123 are cached.

The page manager 120 may perform a selection process to select one of the returned bids 123 (e.g., bid with highest value) for the corresponding placement region 42. In some variations, the selected bid 123 is sent to a rendering service 224, along with the bid selection criteria, to trigger the rendering service 224 to render the supplemental content of the selected bid 123 at the designated placement region 42. Still further, in some variations, the rendering service 224 may replace the selected bid 223 by, for example, matching the value of the selected bid 223, using the bid selection criteria. Thus, the rendering service 224 may be triggered to place an alternative supplemental content item in the placement region 42.

When supplemental content is provided on the rendered page, the page manager utilizes the placement logic 124 to monitor 212 the rendering of the supplemental content item. The rendered supplemental content item may be monitored as to its duration of rendered time, portion of content region that is viewable in the window 22 of the browser 12, and/or other viewability criteria.

In an example of FIG. 2A, the page manager 120 detects a next page event 203, such as the user clicking to see additional or new primary content. In response to the event 203, the browser 12 may send a request 211 to the page server 110, and the page server 110 may return new or updated primary content 231. Additionally, in response to the event 203, the page manager 120 may make a determination as to whether the supplemental content acquisition process is to be performed based on the monitored parameters (e.g., duration of time and/or portion that of supplemental content that is viewable). In an example provided, the page manager 120 is shown as implementing the supplemental content acquisition process 200 at a first page view event 203, coinciding with the determination that the rendered (or existing) supplemental content of the placement region 42 satisfies the viewability criteria. In performing the supplemental content acquisition process 200, the page manager 120 may select one of the returned bids 123 for submission to the service 224. As an addition or variation, the page manager 120 may determine the selected bid for the event 203 using the returned bids and the cached bids from a prior page event (e.g., page creation event 201). Additionally, unused bids 123 may be cached for subsequent use, subject to restrictions such as the unused bids expiring within a preset period of time.

With further reference to FIG. 2A, the page manager 120 detects a subsequent page event 205 (e.g., user clicking to see additional or new primary content). In response to the event 205, the browser 12 may sends another request 15 to the page server 110, and the page server 110 return new or updated primary content. In response to the event 205, the page manager 120 makes another determination as to whether the supplemental content acquisition process is to be implemented for the particular placement region 42. In an example of FIG. 2A, in response to event 205, the page manager 120 determines to not initiate the supplemental content acquisition process, coinciding with monitored parameters indicating that the rendered supplemental content item does not satisfy viewability criteria. In this manner, the page manager 120 selectively implements the supplemental content acquisition process 200 based on, for example, monitored parameters (e.g., duration of time and/or portion that of supplemental content that is viewable). For example, at a next instance 207, the page manager 120 may determine, through use of placement logic 124, that rendering of the existing supplemental content item satisfies the viewability criteria. In response to the determination, the page manager 120 initiates the supplemental content acquisition process by sending requests 121 to the content sources 224, to receive responses 123. From the responses 123, the page manager 120 may make a selection, and the selected bid is sent to the content rendering service 224 to trigger rendering of either the supplemental content item of the selected bid, or of another content item identified by the rendering service 224 for the same value.

Figure 2B:
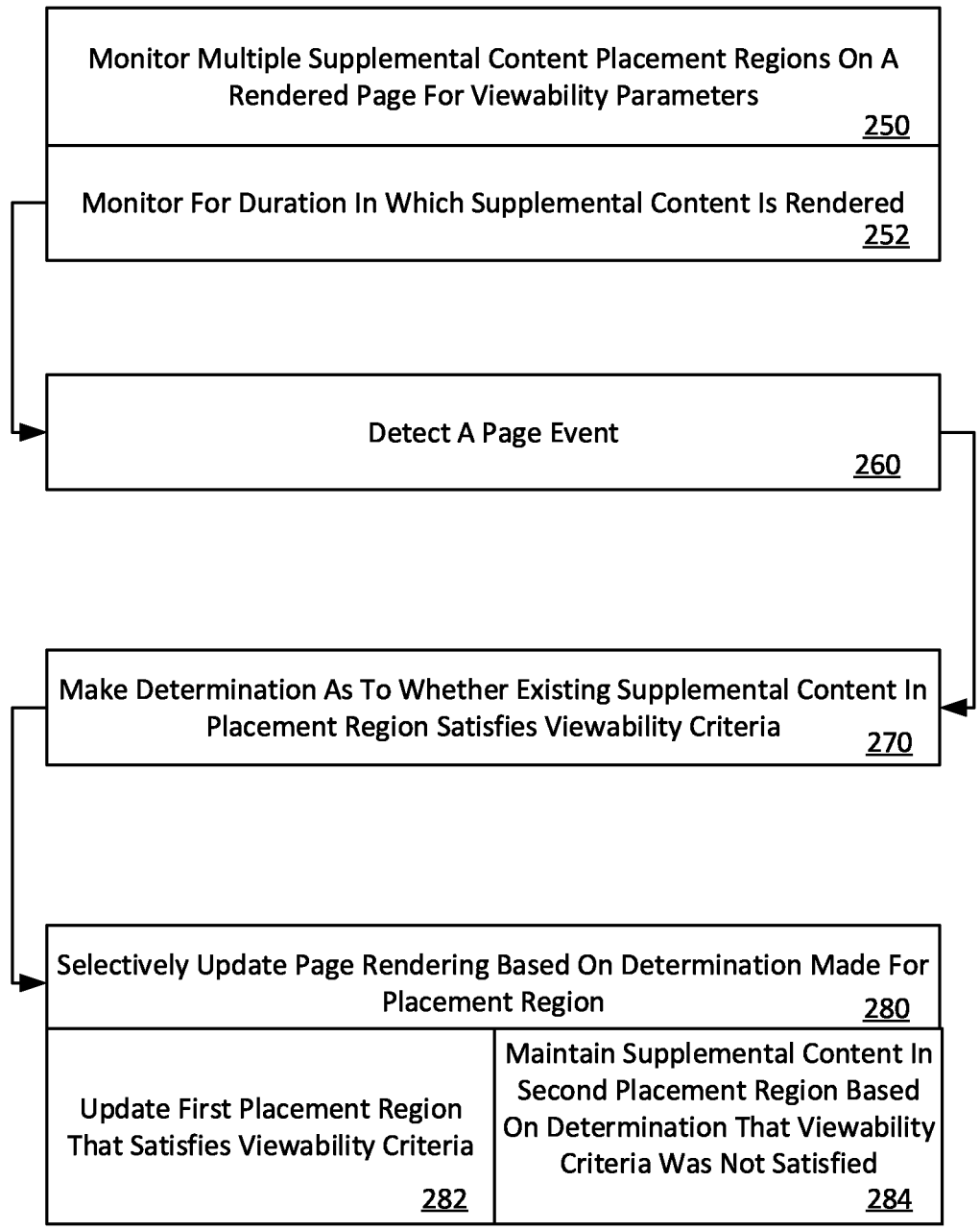
FIG. 2B illustrates a method for providing a page rendering, according to one or more examples.

FIG. 2B illustrates a method for providing a page rendering, according to one or more examples. As described, an example method of FIG. 2B provides for selectively performing a supplemental content acquisition process, in connection with rendering of primary content. A method such as described with an example of FIG. 2B may be implemented using functionality described with an example of FIG. 1. Accordingly, reference may be made to elements of FIG. 1 for purpose of illustrating suitable steps or sub-steps for performing a step or sub-step being described.

With reference to FIG. 2B, upon browser 12 rendering the page, the page manager 120 monitors each of multiple supplemental content placement regions for one or more viewability parameters (250). In some examples, the viewability parameters include a duration in which an existing supplemental content is rendered in the respective placement region as part of the page rendering (252).

The page manager 120 may detect a page event, coinciding with, for example, the page server 110 being triggered to provide a new primary content to update a primary content region of the page rendering (260). For each of the multiple placement regions, the page manager 120 makes a determination as to whether the one or more viewability parameters for that placement region's existing supplemental content satisfy viewability criteria (270). The viewability criteria may coincide with, for example, a duration in which supplemental content is rendered in a given placement region, and/or a portion of the supplemental content which is viewable over the duration.

In response to the page event, the page manager 120 selectively updates the page rendering 25, based on the determination made for each placement region 42 (280). The page manager 120 may update the page rendering 25 by replacing the existing supplemental content that is rendered with a first placement region of the rendered page 25 with new supplemental content based on the determination that the existing supplemental content for the first placement region satisfies the viewability criteria (282). As an addition or alternative, the page manager 120 may maintain the existing supplemental content at a second placement region based on the determination that existing supplemental content that is rendered in that region did not satisfy the viewability criterion (284).

Figure 3:
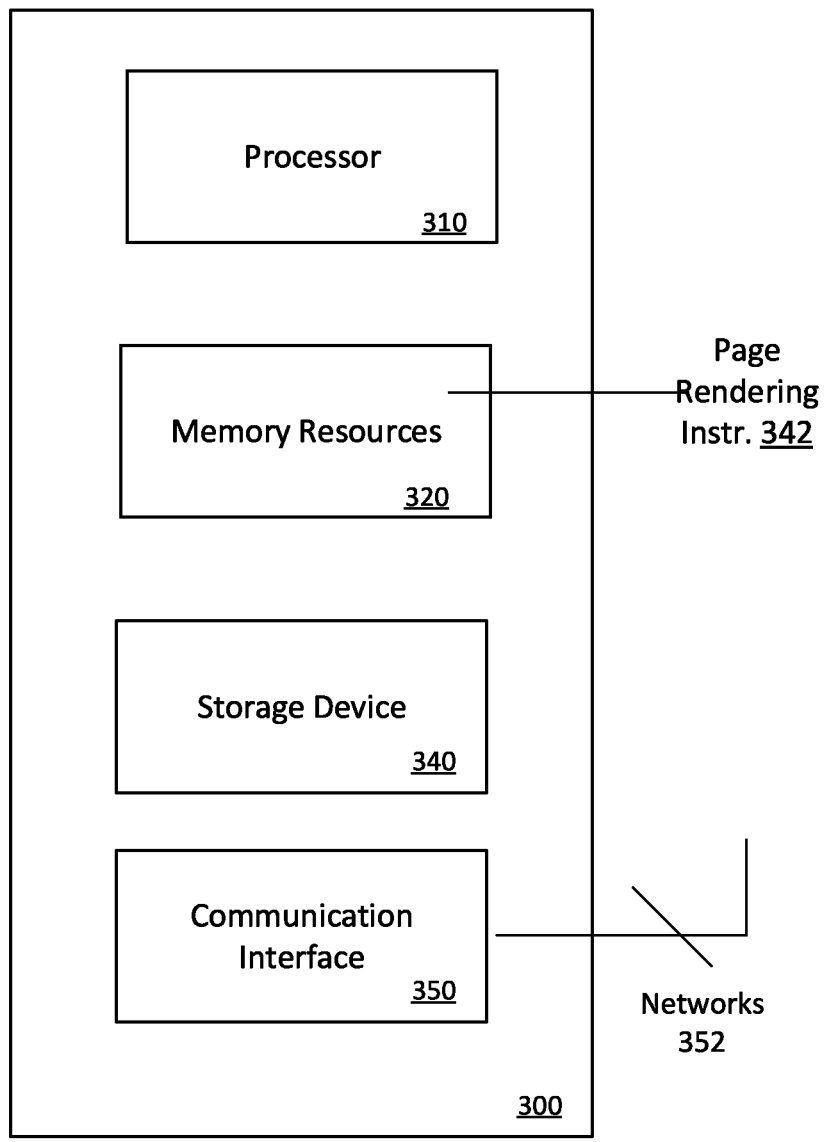
FIG. 3 is a block diagram that illustrates a computer system upon which embodiments described herein may be implemented.

FIG. 3 is a block diagram that illustrates a computer system upon which embodiments described herein may be implemented. A computer system 300 can be implemented on, for example, a server or combination of servers. For example, the computer system 300 may be implemented as part of a network service for providing transport services. In the context of FIG. 1, some or all of the functionality described with a page rendering system may be implemented using computer system 300. Likewise, a method such as described with an example of FIG. 2 may also be implemented using computer system 300.

In one implementation, the computer system 300 includes processing resources 310, memory resources 320 (e.g., read-only memory (ROM) or random access memory (RAM)), a storage device 340, and a communication interface 350. The computer system 300 includes at least one processor 310 to process information (including storing temporary variables) and execute instructions stored in the memory resources 320. The computer system 300 may also include additional storage devices for storing static information and instructions for the processor 310. A storage device 440, such as a magnetic disk or optical disk, is shown for storing information and instructions.

The communication interface 350 enables the computer system 300 to communicate with one or more client devices, over one or more networks 352 (e.g., cellular network) through use of the network link (wireless or a wire). In particular, the computer system 300 may use memory resources 320 to store executable instructions (shown as "page rendering system instructions 342") that can be executed on the computer system 300 to configure browsers and/or browser-enabled applications of respective client devices, in order to implement functionality such as described with a page rendering system of an example of FIG. 1. As an addition or variation, the computer system 300 may transfer scripts, browser logic, plugins or other instructions to client computers in order to enable a distributed computing platform on which page rendering functionality such as described with an example of FIG. 1 may be provided.

Examples described herein are related to the use of the computer system 300 for implementing the techniques described herein. According to an aspect, techniques are performed by the computer system 300 in response to the processor 310 executing one or more sequences of one or more instructions contained in the memory resources 320. Such instructions may be read into the memory resources 320 from another machine-readable medium, such as the storage device 340. Execution of the sequences of instructions contained in the memory resources 320 may cause the processor 310 to perform the process steps described herein. In alternative implementations, hard-wired circuitry may be used in place of or in combination with software instructions to implement examples described herein. Thus, the examples described are not limited to any specific combination of hardware circuitry and software.

Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A computer system comprising:
   one or more processors;
   a memory;
   wherein the one or more processors execute the instructions stored in memory to perform operations that include:
   identifying a page rendering provided on a client computer, the page rendering being structured to include a primary content region in which a primary content is provided, and one or more placement regions, including a first placement region in which a supplemental content is provided;
   monitoring the page rendering, including the supplemental content of the one or more placement regions, for one or more viewability parameters, the viewability parameters including a duration in which the supplemental content is rendered in each of the one or more placement regions;
   detecting a page event that triggers selection of new primary content to update the primary content region;
   in response to detecting the page event, selectively updating the one or more placement regions of the rendered page based on the one or more viewability parameters, by making a determination to perform, and then performing, one of (A) initiating selection of new supplemental content for at least a first placement region of the one or more placement regions; and/or (B) maintaining the supplemental content of at least the first placement region or a second placement region of the one or more placement regions;

wherein selectively updating the one or more placement regions includes implementing a cut-off time of 1 second or less for receipt of bids in order to ensure rendering of the supplemental content in conjunction with the page event;

wherein the operations further comprise:

caching each of multiple bids received after the cut-off time, for consideration at a next page event, each cached bid of the multiple cached bids being associated with a timespan that designates a duration in which the cached bid will be considered; and wherein selectively updating the one or more placement regions of the rendered page includes providing an alternative content item corresponding to one of the multiple cached bids, based on a value of the corresponding cached bid.

2. The computer system of claim 1 wherein the viewability parameters define a viewability criteria of duration of an advertisement.

3. The computer system of claim 1 wherein the cut-off time for receipt of bids 100 ms or less.

4. The computer system of claim 1 wherein the first placement region includes a sub-region for an additional rendering service for supplemental content.

5. The computer system of claim 1 wherein the supplemental content is provided by a content source.

6. The computer system of claim 5 wherein the content source is an advertising network.

7. A computer network comprising a page server providing:

a page rendering provided on a client computer, the page rendering being structured to include a primary content region in which a primary content is provided and including a first placement region in which a supplemental content is provided;

the supplemental content being associated with one or more viewability criteria having a duration in which the supplemental content is rendered in the first placement region;

a page event that triggers selection of new supplemental content with respect to bids for advertisements; and a page manager holds-over unused bids and the page manager to cache unused bids for a given duration of time when the bids are unused after an initial page event, the page manager considers the cached bids at the next page event and the cached bids are associated with a timespan that designates the duration in which the cached bids will be considered;

wherein the one or more viewability criteria is based on a corresponding value of the supplemental content provided with the first placement region.

8. The computer network of claim 7 wherein the page manager implements a cut-off time for receipt of bids at 100 ms.

9. The computer network of claim 7 further comprising a page server including a processor and a memory.

10. The computer network of claim 7 wherein the page server selectively updates one or more placement regions of the rendered page by making a determination, from the one or more viewability criteria as to whether the supplemental content of the page rendering has satisfied the viewability criteria, and initiating selection of new supplemental content for at least a first placement region of the one or more placement regions, in response to making the determination that the supplemental content of the first placement region satisfied the viewability criteria.

11. A non-transitory computer-readable medium that stores instructions, which when executed by one or more processors of a computer system, cause the computer system to perform operations comprising:

identifying a page rendering provided on a client computer, the page rendering being structured to include a primary content region in which a primary content is provided, and one or more placement regions, including a first placement region in which a supplemental content is provided;

monitoring the page rendering, including the supplemental content of the one or more placement regions, for one or more viewability parameters, the viewability parameters including a duration in which the supplemental content is rendered in each of the one or more placement regions;

detecting a page event that triggers selection of new primary content to update the primary content region; and in response to detecting the page event, selectively updating the one or more placement regions of the rendered page based on the one or more viewability parameters, by making a determination to perform, and then performing, one of (A) initiating selection of new supplemental content for at least a first placement region of the one or more placement regions; and/or (B) maintaining the supplemental content of at least the first placement region or a second placement region of the one or more placement regions;

implementing a cut-off time of 1 second or less for receipt of bids in order to ensure rendering of the supplemental content in conjunction with the page event;

wherein the operations further comprise:

caching each of multiple bids received after the cut-off time for consideration at a next page event, each cached bid of the multiple cached bids being associated with a timespan that designates a duration in which the cached bid will be considered; and wherein selectively updating the one or more placement regions of the rendered page includes providing an alternative content item corresponding to one of the multiple cached bids, based on a value of the corresponding cached bid.

\* \* \* \* \*